United States Patent
Qu et al.

(10) Patent No.: US 10,371,882 B2
(45) Date of Patent: Aug. 6, 2019

(54) METHOD FOR MANUFACTURING DIMMING STRUCTURE, DIMMING STRUCTURE, BACKLIGHT MODULE AND DISPLAY DEVICE

(71) Applicants: BOE TECHNOLOGY GROUP CO., LTD., Beijing (CN); Beijing BOE Display Technology Co., Ltd., Beijing (CN)

(72) Inventors: Lianjie Qu, Beijing (CN); Huijuan Wang, Beijing (CN); Yonglian Qi, Beijing (CN); Bingqiang Gui, Beijing (CN); Fang Liu, Beijing (CN); Hebin Zhao, Beijing (CN); Huipeng Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/982,031

(22) Filed: May 17, 2018

(65) Prior Publication Data

US 2019/0041569 A1   Feb. 7, 2019

(30) Foreign Application Priority Data

Aug. 1, 2017 (CN) .......................... 2017 1 0647902

(51) Int. Cl.
  *F21V 8/00* (2006.01)
  *B29C 35/16* (2006.01)
  *B29C 35/02* (2006.01)
(52) U.S. Cl.
  CPC ............ *G02B 6/0065* (2013.01); *B29C 35/02* (2013.01); *B29C 35/16* (2013.01); *G02B 6/0055* (2013.01)

(58) Field of Classification Search
  CPC .... G02B 6/0065; G02B 6/0055; B29C 35/02; B29C 35/16
  See application file for complete search history.

(56) References Cited

U.S. PATENT DOCUMENTS

| 7,720,347 B2* | 5/2010 | Lee ...................... G02B 6/0038 349/56 |
| 2004/0248049 A1* | 12/2004 | Tsai ..................... G02B 6/0036 430/323 |

(Continued)

FOREIGN PATENT DOCUMENTS

| CN | 1965253 A | 5/2007 |
| CN | 101440935 A | 5/2009 |
| JP | 2001356704 A | 12/2001 |

OTHER PUBLICATIONS

First Office Action for Chinese Patent Application No. 201710647902.8 dated Feb. 28, 2019.

*Primary Examiner* — Mary Ellen Bowman
(74) *Attorney, Agent, or Firm* — Calfee, Halter & Griswold LLP

(57) ABSTRACT

The present disclosure relates to a manufacturing method for a light adjusting structure, a light adjusting structure, a backlight module and a display device. The manufacturing method includes: providing a light guide plate; forming a substrate having a plurality of micro structures; and placing the micro structures upside down on a light exit surface of the light guide plate; heating the light guide plate; adhering the tips of the micro structures to the light guide plate; cooling the light guide plate; and forming a first reflective layer on the side surface of each micro structure.

20 Claims, 3 Drawing Sheets

(56) References Cited

U.S. PATENT DOCUMENTS

2005/0194351 A1* 9/2005 Yu ................... B29D 11/00663
 216/24
2007/0279933 A1 12/2007 Shiau et al.

\* cited by examiner

METHOD FOR MANUFACTURING DIMMING STRUCTURE, DIMMING STRUCTURE, BACKLIGHT MODULE AND DISPLAY DEVICE

CROSS REFERENCE TO RELATED APPLICATIONS

This application claims the benefit of China Patent Application No. 201710647902.8 filed with the China Patent Office on Aug. 1, 2017, the entire content of which is hereby incorporated by reference.

TECHNICAL FIELD

The present disclosure relates to the field of display technology, and in particular, to a method for manufacturing a light adjusting structure, a light adjusting structure, a backlight module, and a display device.

BACKGROUND

With the rise of three-dimensional (3D) display products, holographic display products and other special display products, a crucial demand on devices has been raised—light modulation. As shown in FIG. 1, it is a schematic diagram of an optical path adjustment of a light guide plate with micro structures in the related art. As shown in FIG. 1, the lights emitted by the light source are reflected on the micro structures of the light guide plate to form collimated lights. The collimated lights may be utilized to realize devices such as 3D display or holographic display.

At present, the main process for manufacturing the micro structures is a Lithography-Electro-Injection-Injection (LIGA) process. The LIGA process includes the following steps. First, a photoresist master mold is formed on a base substrate and the surface of the photoresist master mold is processed with conduction treatment. After that, the above-mentioned photoresist master mold is used to form a mold through an electroforming process and a demolding process. Afterwards, a pattern of micro structures is formed by pressing the mold. Then, a high anti-metal sputtering is performed on the pattern of the micro structures to make them has reflection function. Afterwards, the tips of the micro structures are removed through a sharpening process to achieve the light transmission function of the micro structures. Otherwise, the light cannot enter the micro structures to achieve reflection.

However, since the micro structures are generally structures of tens of micrometers, overall sharpening cannot be performed like on a macro structure. In addition, in order to ensure that all the micro structures are closely connected with the light guide plate, to achieve the adhesion precision between the micro structures and the light guide plate, it is required that the tips of the micro structures processed by the sharpening process have high flatness and a high degree of uniformity, which has a high requirement on the sharpening process. There is no suitable sharpening process yet in the related art which can achieve high adhesion precision between the micro structures and the light guide plat.

SUMMARY

I One embodiment of the present disclosure provides a manufacturing method for a light adjusting structure, including:

providing a light guide plate;

preparing a substrate with a plurality of micro structures;

placing the micro structures upside down on a light exit surface of the light guide plate;

heating the light guide plate;

respectively adhering tips of the micro structures to the light guide plate;

cooling the light guide plate; and forming a first reflective layer on the side surface of each of the micro structures.

In one possible implementation, in the above manufacturing method provided by the embodiment of the present disclosure, preparing a substrate with a plurality of micro structures includes:

providing a base substrate;

forming a photoresist master mold on the base substrate, and processing the surface of the photoresist master mold with a conduction treatment;

taking the photoresist master mold after surface conduction treatment as an electroforming mold; and integrally forming micro structures and a substrate that carries the micro structures with the electroforming mold.

In one possible implementation, in the above manufacturing method provided by the embodiment of the present disclosure, respectively adhering tips of the micro structures to the light guide plate includes:

pressing the substrate until the tip of each micro structure forms a surface contact with the light guide plate; or pressing the substrate until the tip of each micro structure is embedded into the light guide plate.

In one possible implementation, in the above manufacturing method provided by the embodiment of the present disclosure, at the same time of forming a first reflective layer on the side surface of each of the micro structures, the method further includes:

forming a second reflective layer on at least one of the light exit surface of the light guide plate on which no micro structure is adhered and the surface of the substrate at the side facing the light guide plate on which no micro structure is adhered.

An embodiment of the present disclosure also provides a light adjusting structure, wherein the light adjusting structure is manufactured with the above manufacturing method.

In one possible implementation, in the above light adjusting structure, the refractive index of each of the micro structures is the same as the refractive index of the light guide plate.

In one possible implementation, in the above light adjusting structure, the material of each of the micro structures is the same as the material of the light guide plate.

In one possible implementation, in the above light adjusting structure, the side surface of each micro structure is a curved surface with a curvature decreasing gradually from the light guide plate in a direction away from the light guide plate.

An embodiment of the present disclosure also provides a backlight module, including above the light adjusting structure and a backlight provided on a light incident side of the light guide plate.

An embodiment of the present disclosure also provides display device, including the above backlight module.

DETAILED DESCRIPTION

Figure 1:
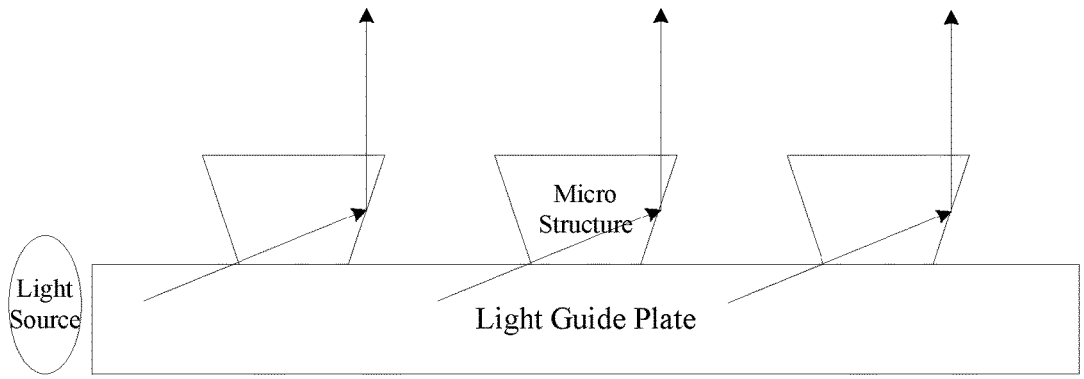
FIG. 1 is a schematic diagram of an optical path adjustment of a light guide plate with micro structures in the related art.

The method for manufacturing a light adjusting structure, a light adjusting structure, a backlight module, and a display device provided by the embodiments of the present disclosure will be described in detail with reference to the accompanying drawings. It should be noted that the embodiments described herein are merely some but not all of the embodiments of the present disclosure. All other embodiments obtained by a person of ordinary skill in the art based on the embodiments of the present disclosure without creative efforts shall fall within the protection scope of the present disclosure.

The shapes and sizes of the film layers in the drawings do not reflect the true proportions of the light adjusting structures and are only intended to schematically illustrate the content of the present disclosure.

Figure 2:
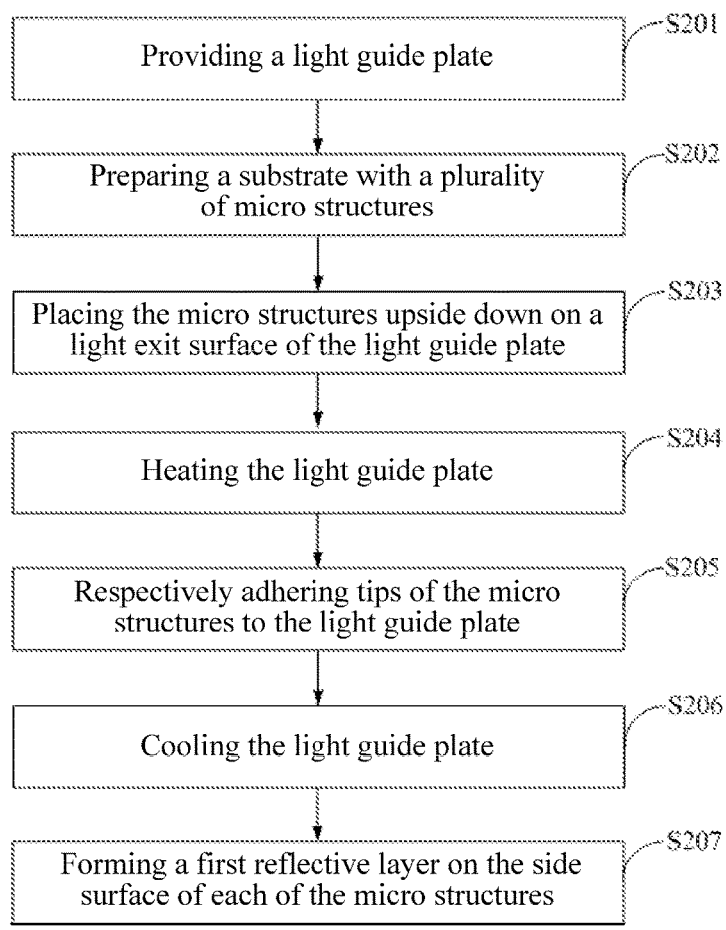
FIG. 2 is a flowchart of a method for manufacturing a light adjusting structure according to an embodiment of the present disclosure.

A method for manufacturing a light adjusting structure provided in an embodiment of the present disclosure, as shown in FIG. 2, may include the following steps.

In S201, a light guide plate is provided.

In S202, a substrate with a plurality of micro structures is prepared.

In S203, the micro structures are placed upside down on a light exit surface of the light guide plate.

In S204, the light guide plate is heated.

In S205, tips of the micro structures are respectively adhered to the light guide plate.

In S206: the light guide plate is cooled.

In S207, the side surface of each micro structure is formed with a first reflective layer.

In the above manufacturing method provided by the embodiment of the present disclosure, compared to the micro structures after the sharpening process in the related art, the micro structures provided by the present disclosure can have excellent tip flatness and high degree of uniformity. Therefore, when adhering the tips of the micro structures with the light guide plate, the adhesion precision can be effectively controlled. After that, a first reflective layer is formed on the side surface of each micro structure, and adjustment of the light emitted from the light guide plate by each micro structure can be realized. Therefore, not only the adhesion precision between the micro structures and the light guide plate can be improved, but also a sharpening process for removing the metal at the tip of each micro structure can be eliminated, which can simplify the manufacturing process.

It should be noted that in the above manufacturing method provided in the embodiment of the present disclosure, the performing sequence of steps S201 and S202 is not limited to the sequence as shown in FIG. 2. In exemplary implementations, step S202 may also be performed first, and then step S201, which is not limited herein.

In addition, in the above manufacturing method provided in the embodiment of the present disclosure, the objective of performing the heating process of the light guide plate in step S204 is to make the light guide plate have a certain plasticity so as to facilitate the close adhesion of the subsequent micro structures and the light guide plate. In view of this, the material of the light guide plate provided in step S201 is preferably a thermoplastic material. Preferably, the material of the light guide plate may be Polymeric Methyl Methacrylate (PMMA). The light guide plate made of PMMA material can not only have good plasticity, but also have good transparency, which is conducive to the propagation of light.

In an exemplary implementation, in the above manufacturing method provided in the embodiment of the present disclosure, step S202 prepares a substrate having a plurality of micro structures, which can be implemented by the following steps:

providing a base substrate;

forming a photoresist master mold on the base substrate, and processing the surface of the photoresist master mold with a conduction treatment;

taking the photoresist master mold after surface conduction treatment as an electroforming mold; and integrally forming micro structures and a substrate that carries the micro structures with the electroforming mold.

In the above-mentioned manufacturing method provided in the embodiment of the present disclosure, a photoresist master mold may be formed on a base substrate by using ultraviolet (UV) photoresist or other types of photoresist materials. In order to facilitate the subsequent electroforming process, an electroforming mold is formed by performing conduction treatment on the surface of the photoresist master mold, generally through applying conductive powder, chemical coating or vacuum coating. Then, the photoresist master mold is processed with electroforming process, to obtain an electroforming mold after demolding operation. Finally, the electroforming mold is utilized to form a substrate having a plurality of micro structures. That is, the micro structures and the substrate that carries the micro structures are integrally formed.

It is worth noting that the larger the number of micro structures is, there are more adjustable light beams emitted from the light guide plate. Therefore, it is preferable that the micro structures completely cover the surface of the substrate. That is, there is no gap between any two adjacent micro structures. Of course, in an exemplary implementation, there may also be a certain gap between any two neighboring micro structures, which is not limited herein.

In an exemplary implementation, in order to ensure the adhesion precision between the micro structures and the light guide plate, in the above-described manufacturing method provided in the embodiment of the present disclosure, the tips of the micro structures are respectively adhered to the light guide plate in step S205, through the following manners:

pressing the substrate until the tip of each micro structure forms a surface contact with the light guide plate; or, pressing the substrate until the tip of each micro structure is embedded into the light guide plate.

In the above manufacturing method provided by the embodiments of the present disclosure, since the micro structures are located on the same substrate, in the actual operation, only a certain force is needed to be applied to the substrate that carries the micro structures, and the close contact between the tips of the micro structures and the light guide plate can be realized. It facilitates the light emitted from the light guide plate to enter into each micro structure, and to be adjusted after being reflected by the first reflective layer covered by the side surface of each micro structure. For example, the light is adjusted to a collimated light perpendicular to the light exit surface of the light guide plate after being reflected by the first reflective layer.

In an exemplary implementation, in order to reduce light loss, the light emitted from the light guide plate is irradiated as much as possible to the area where the micro structures are located. In the above-described manufacturing method provided by the embodiment of the present disclosure, in step 207, while the first reflective layer is formed on the side surface of each micro structure, the following steps can also be performed:

forming a second reflective layer on the light exit surface of the light guide plate, on which no micro structure is adhered; forming a second reflective layer on the surface of the substrate at the side facing the light guide plate, on which no micro structure is adhered; or forming a second reflective layer respectively on the light exit surface of the light guide plate, on which no micro structure is adhered, and on the surface of the substrate at the side facing the light guide plate, on which no micro structure is adhered.

In the above manufacturing method provided in the embodiment of the present disclosure, the first reflective layers on the side surfaces of the micro structures, and at least one of the second reflective layers on the light exit surface of the light guide plate on which no micro structure is adhered and the surface of the substrate at the side facing the light guide plate on which no micro structure is adhered, may be formed at the same time with an electroplating process. Of course, in an exemplary implementation, the first reflective layers and the second reflective layers may also be fabricated by other processes known to those skilled in the art, such as a magnetron sputtering process, which is not limited herein.

In addition, in an exemplary implementation, in the above-mentioned manufacturing method provided in the embodiment of the present disclosure, before or after the first reflective layers are formed on the side surfaces of the micro structures, at least one of the second reflective layers on the light exit surface of the light guide plate on which no micro structure is adhered and the surface of the substrate at the side facing the light guide plate on which no micro structure is adhered are formed, which is not limited herein.

Preferably, in the above-mentioned manufacturing method provided in the embodiment of the present disclosure, in order to obtain a better reflection effect, the materials of the first reflective layer and the second reflective layer may be highly reflective metals such as aluminum and silver. Other reflective materials known to those skilled in the art may also be used and are not limited herein.

Figure 3A:
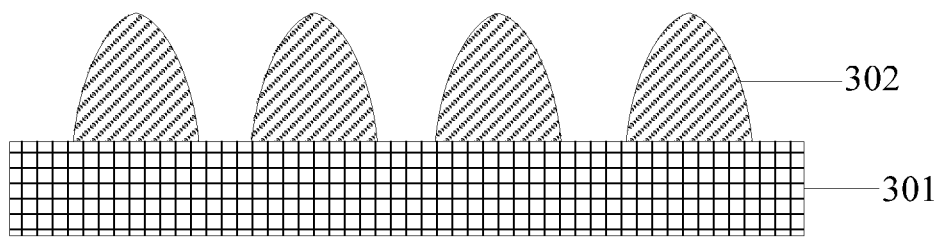
FIG. 3a to FIG. 3g are respectively schematic structural diagrams of the corresponding light adjusting structures after performing the steps of the manufacturing method provided by the embodiment of the present disclosure.
Figure 3B:
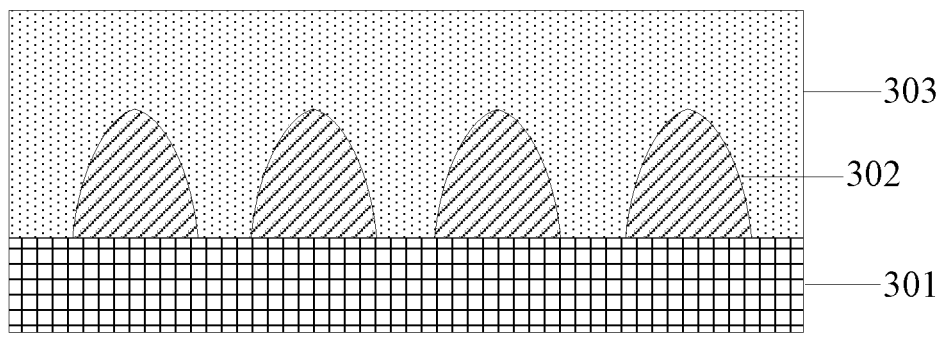
Figure 3C:
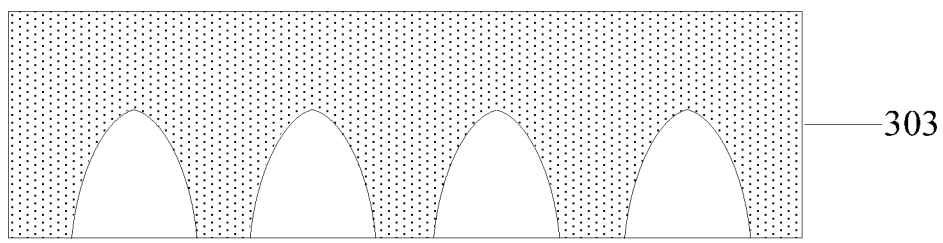
Figure 3D:
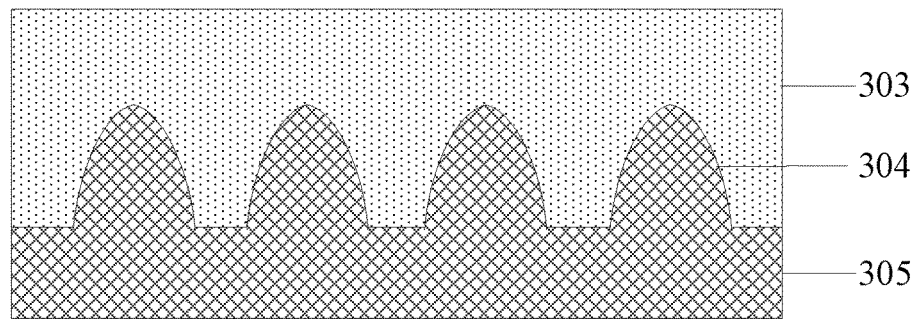
Figure 3E:
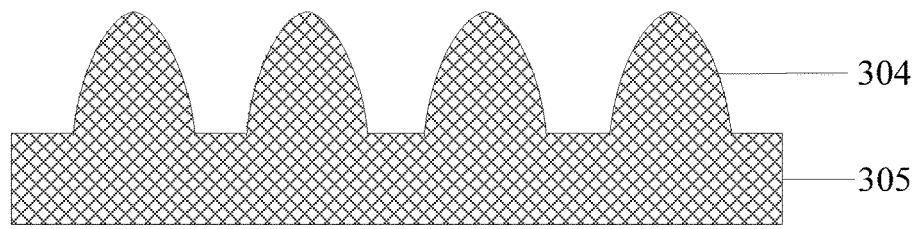
Figure 3F:
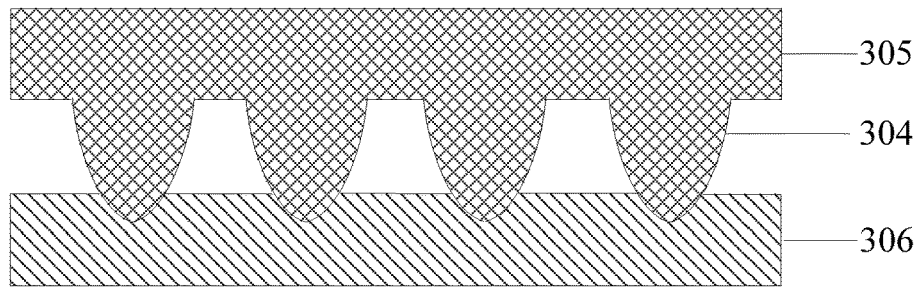
Figure 3G:
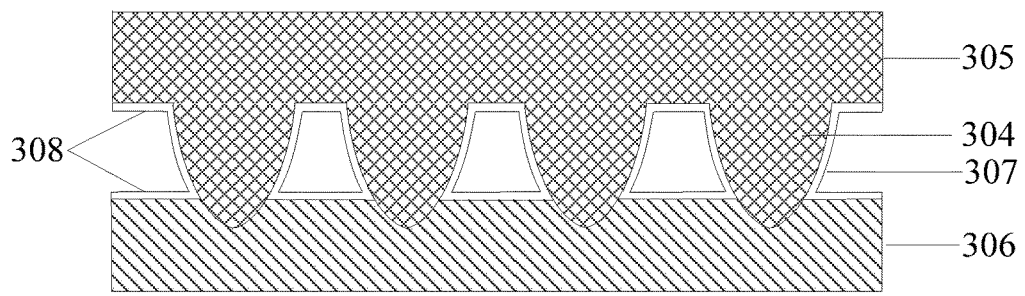

In order to better understand the technical solution of the present disclosure, an embodiment of the present disclosure provides a detailed process for manufacturing a light adjusting structure with the above manufacturing method. Exemplary implementation steps are as follows:

providing a base substrate 301; forming a photoresist master mold 302 on the base substrate 301 with UV photoresist, and processing the photoresist master mold 302 with conduction treatment, as shown in FIG. 3a;

processing the photoresist master mold 302 with an electroforming process, as shown in FIG. 3b, and to obtain an electroforming mold 303 after the demolding operation, as shown in FIG. 3c;

integrally forming micro structures 304 and a substrate 305 that carries the micro structures with the electroforming mold 303, as shown in FIGS. 3d and 3e;

providing a light guide plate 306, and placing the formed micro structures 304 upside down on the light exit surface of the light guide plate 306, then, heating the light guide plate 306, pressing the substrate 305 until the tips of the micro structures 304 are embedded into the light guide plate 306;

cooling the light guide plate 306, to realize the close adhesion between the micro structures 304 and the light guide plate 306, as shown in FIG. 3f; and forming first reflective layers 307 on the side surfaces of the micro structures 304, and at the same time, forming second reflective layers 308 on the light exit surface of the light guide plate 306, on which no micro structure is adhered, and on the surface of the substrate 305 facing the surface on one side of the light guide plate 306, on which no micro structure is adhered. So far, a light adjusting structure provided by an embodiment of the present disclosure is obtained as shown in FIG. 3g.

Based on the same inventive concept, an embodiment of the present disclosure provides a light adjusting structure. The light adjusting structure is manufactured with the above manufacturing method. Since the principle of solving the problem by the light adjusting structure is similar to that of the above-mentioned manufacturing method, the implementation of the light adjusting structure provided by the embodiment of the present disclosure may refer to the implementation of the above-mentioned manufacturing method provided by the embodiment of the present disclosure. The similar part will not be repeated.

In general, at the boundary between two media with different refractive indices, both reflection phenomenon and refraction phenomenon occur simultaneously. The reflected light will return to the original medium, and the refracted light will enter into another medium. It can be seen that if the refractive index of each micro structure is different from the refractive index of the light guide plate, the light emitted from the light guide plate to the region where the micro structure is located can only be partially refracted into the micro structure, and the rest of the light will be reflected back to the light guide plate, thereby reducing the utilization of light. Therefore, preferably, in order to reduce the light loss, in the above-mentioned light adjusting structure provided by the embodiment of the present disclosure, the refractive index of each micro structure is the same as the refractive index of the light guide plate. Also, preferably, in an exemplary implementation, the same type of material can be used to form the micro structures and the light guide plate.

It should be noted that, when using the same material to form the micro structures and the light guide plate, the light adjusting structure provided in the embodiments of the present disclosure may include at least the micro structures and the light guide plate, that is, the micro structures and the light guide plate may be produced through an integral molding process. It can eliminate the step of adhering the micro structures to the light guide plate, and simplify the manufacturing process. Then, first reflective layers are formed on the side surfaces of the micro structure to achieve reflection of light emitted from the light guide plate to the area where the micro structures are located.

In an exemplary implementation, in order to obtain the effect of converging light, in the above-mentioned light adjusting structure provided by the embodiment of the present disclosure, the side surface of each micro structure is a curved surface with the curvature thereof decreasing gradually from the light guide plate in a direction away from the light guide plate. Of course, the side surface of each micro structure may also be planar, which is not limited herein.

Based on the same inventive concept, an embodiment of the present disclosure provides a backlight module including: the above-mentioned light adjusting structure, and a backlight provided on the light incident side of the light guide plate. Since the principle of the backlight module to solve the problem is similar to that of the above light adjusting structure, the implementation of the backlight module provided by the embodiment of the present disclosure may refer to the implementation of the above light adjusting structure provided by the embodiment of the present disclosure. The similar part will not be repeated.

Based on the same inventive concept, an embodiment of the present disclosure further provides a display device including the above backlight module provided by the embodiment of the present disclosure. The display device may be: a mobile phone, a tablet computer, a television, a display, a notebook computer, and a digital photo frame, a navigator, a smart watch, a fitness wristband, a personal digital assistant, etc. and any product or component that has display capabilities. For the implementation of the display device, reference may be made to the above embodiment of the backlight module, and the repeated description is omitted.

According to the embodiments of the present disclosure, a method for manufacturing a light adjusting structure, a light adjusting structure, a backlight module, and a display device are provided. The manufacturing method includes: providing a light guide plate; forming a substrate having a plurality of micro structures; and placing the micro structures upside down on a light exit surface of the light guide plate; heating the light guide plate; adhering the tips of the micro structures to the light guide plate; cooling the light guide plate; and forming a first reflective layer on the side surface of each micro structure. Compared to the micro structures after the sharpening process in the related art, the micro structures provided by the present disclosure can have excellent tip flatness and high degree of uniformity. Therefore, when adhering the tips of the micro structures with the light guide plate, the adhesion precision can be effectively controlled. After that, a first reflective layer is formed on the side surface of each micro structure, and adjustment of the light emitted from the light guide plate by each micro structure can be realized. Therefore, not only the adhesion precision between the micro structures and the light guide plate can be improved, but also a sharpening process for removing the metal at the tip of each micro structure can be eliminated, which can simplify the manufacturing process.

It should be noted that as used herein, relational terms such as first and second are only used to distinguish one entity or operation from another entity or operation, and do not necessarily require or imply any actual relationship or order between these entities or operations.

It will be apparent to those skilled in the art that various modifications and variations can be made in the present disclosure without departing from the spirit and scope of the present disclosure. Thus, if these modifications and variations of the present disclosure fall within the scope of the claims of the present disclosure and their equivalents, the present disclosure is also intended to include these modifications and variations.

What is claimed is:

1. A manufacturing method for a light adjusting structure, comprising:
   providing a light guide plate;
   preparing a substrate with a plurality of micro structures;
   placing the micro structures upside down on a light exit surface of the light guide plate;
   heating the light guide plate;
   respectively adhering tips of the micro structures to the light guide plate;
   cooling the light guide plate; and
   forming a first reflective layer on a side surface of each of the micro structures.

2. The manufacturing method according to claim 1, wherein the step of preparing a substrate with a plurality of micro structures comprises:
   providing a base substrate;
   forming a photoresist master mold on the base substrate, and processing a surface of the photoresist master mold with a conduction treatment;
   taking the photoresist master mold after surface conduction treatment as an electroforming mold; and
   integrally forming micro structures and a substrate that carries the micro structures with the electroforming mold.

3. The manufacturing method according to claim 1, wherein the step of respectively adhering tips of the micro structures to the light guide plate comprises:
   pressing the substrate until the tip of each micro structure forms a surface contact with the light guide plate; or
   pressing the substrate until the tip of each micro structure is embedded into the light guide plate.

4. The manufacturing method according to claim 1, further comprising: at the same time of forming a first reflective layer on the side surface of each of the micro structures,
   forming a second reflective layer on at least one of the light exit surface of the light guide plate on which no micro structure is adhered and the surface of the substrate at the side facing the light guide plate on which no micro structure is adhered.

5. A light adjusting structure, wherein the light adjusting structure is manufactured with the manufacturing method according to claim 1.

6. The light adjusting structure according to claim 5, wherein a refractive index of each of the micro structures is substantially the same as a refractive index of the light guide plate.

7. The light adjusting structure according to claim 6, wherein the material of each of the micro structures is the same as the material of the light guide plate.

8. The light adjusting structure according to claim 5, wherein the side surface of each micro structure is a curved surface with a curvature decreasing gradually from the light guide plate in a direction away from the light guide plate.

9. A backlight module, comprising the light adjusting structure according to claim 5, and a backlight provided on a light incident side of the light guide plate.

10. A display device, comprising the backlight module according to claim 9.

11. The manufacturing method according to claim 2, further comprising: at the same time of forming a first reflective layer on the side surface of each of the micro structures,
    forming a second reflective layer on at least one of the light exit surface of the light guide plate on which no micro structure is adhered and the surface of the substrate at the side facing the light guide plate on which no micro structure is adhered.

12. The manufacturing method according to claim 3, further comprising: at the same time of forming a first reflective layer on the side surface of each of the micro structures,
    forming a second reflective layer on at least one of the light exit surface of the light guide plate on which no micro structure is adhered and the surface of the substrate at the side facing the light guide plate on which no micro structure is adhered.

13. A light adjusting structure, wherein the light adjusting structure is manufactured with the manufacturing method according to claim 2.

14. A light adjusting structure, wherein the light adjusting structure is manufactured with the manufacturing method according to claim 3.

15. A light adjusting structure, wherein the light adjusting structure is manufactured with the manufacturing method according to claim 4.

16. The light adjusting structure according to claim 6, wherein the side surface of each micro structure is a curved surface with a curvature decreasing gradually from the light guide plate in a direction away from the light guide plate.

17. The light adjusting structure according to claim 7, wherein the side surface of each micro structure is a curved surface with a curvature decreasing gradually from the light guide plate in a direction away from the light guide plate.

18. A backlight module, comprising the light adjusting structure according to claim 6, and a backlight provided on a light incident side of the light guide plate.

19. A backlight module, comprising the light adjusting structure according to claim 7, and a backlight provided on a light incident side of the light guide plate.

20. A backlight module, comprising the light adjusting structure according to claim 8, and a backlight provided on a light incident side of the light guide plate.

* * * * *